United States Patent [19]  
Sheng

[11] Patent Number: 4,749,891  
[45] Date of Patent: Jun. 7, 1988

[54] NON-LINEAR ELECTROMAGNETIC VIBRATION DEVICE

[76] Inventor: Cao P. Sheng, 33/5 Jiao Tong Rd., Shanghai, China

[21] Appl. No.: 838,985

[22] Filed: Mar. 12, 1986

[30] Foreign Application Priority Data

Apr. 1, 1985 [CN] China ................. 85 1 02855

[51] Int. Cl.$^4$ ........................................... H02K 33/00
[52] U.S. Cl. ....................................... 310/15; 310/27; 310/29; 310/30
[58] Field of Search ................... 310/15, 27, 28, 29, 310/30, 33, 22

[56] References Cited

U.S. PATENT DOCUMENTS

| | | | |
|---|---|---|---|
| 1,772,596 | 8/1930 | Traylor | 310/27 |
| 2,180,189 | 11/1939 | Alvord | 310/29 X |
| 2,302,983 | 11/1942 | Swallow | 310/27 |
| 3,018,467 | 1/1962 | Harris | 310/27 X |
| 3,170,078 | 2/1965 | Kuschel | 310/29 |
| 3,312,841 | 4/1967 | Makino | 310/28 X |
| 3,522,460 | 8/1970 | Spurlin | 310/29 |
| 3,558,939 | 1/1971 | Olson | 310/29 X |
| 3,764,834 | 10/1973 | Brosch et al. | 310/29 X |
| 3,775,625 | 11/1973 | Brosch et al. | 310/29 X |

Primary Examiner—Donovan F. Duggan  
Attorney, Agent, or Firm—Bradford E. Kile

[57] ABSTRACT

A non-linear electromagnetic vibration device including a first vibration part and a second vibration part. A non-linear bellows plate spring set is connected between the first and second vibrating parts. Each spring set is composed of sequentially coupled bellows plate springs, and each plate spring is elastic according to a predetermined particular waveform and has a plate structure of a predetermined shape. The waveform is selectable among many including portions of an exponential curve. The plate structure of each spring is rectangular with an edge which is straight, convex, or concave in contour. The first vibration part of the device is rigidly connected to a corresponding section of each spring set and the second vibration part of the device is coupled to a different or second area of each spring set. An electromagnetic core and armature of an electromagnetic source and respectively included in a different one of said first and second vibration parts, and stable reciprocating structural components each of a parallelogram shaped configuration are formed. Harmonic resonance frequency conversion can be obtained conveniently via mechanical adjustment of the number of plate springs in each sectionalized waveform plate spring set.

40 Claims, 8 Drawing Sheets

FIG. 9D
FIG. 9E
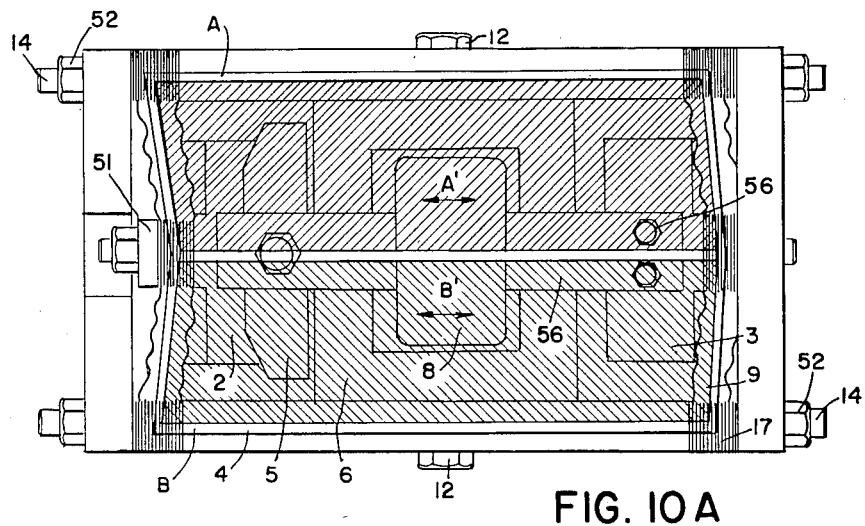
FIG. 10A
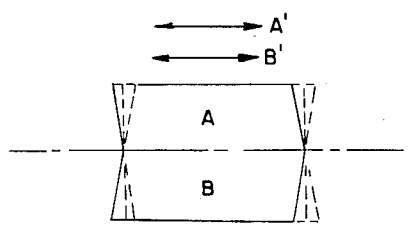
FIG. 10B
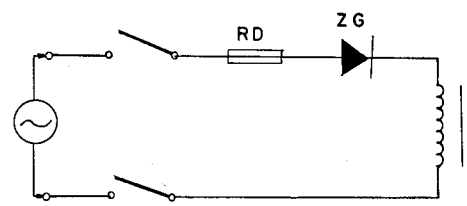
FIG. 11A

NON-LINEAR ELECTROMAGNETIC VIBRATION DEVICE

BACKGROUND AND FIELD OF INVENTION

The subject invention relates to a device for generating mechanical vibrations. More particularly, it relates to an electromagnetic vibration device utilizing non-linear sectionalized waveform plate springs.

Utilization of the principle of electromagnetic shock excitation for designing drivers has been used in the past in many forms of vibrating devices. Thus far, however, the application of vibrating machines is still limited and their energy saving effects and various other potential advantages have not been fully demonstrated nor made practical in wide application.

Prior efforts in this field have largely laid emphasis on structural forms and mass combinations, and two crucial problem areas have not been seriously considered and addressed, namely: (1) the design, manufacture, and parameter selection for the vibration component, and (2) the control of mechanical vibration.

Mechanical vibration is a complex physical phenomenon. Its amplitude, frequency, energy dissipation, and limits of stored and released energy depend on numerous factors including: (a) rigidity characteristics of the vibration component, (b) structural damping of the vibration component, (c) magnitude, frequency, and other characteristics of a shock exciting force, (d) magnitude and type of external damping, and (e) expected variations and changes in load.

If the vibration component is a linear spring (with constant rigidity), damping is directly proportional to velocity and a linear vibration system is formed. When such a system is applied to vibration machines, and disadvantages are that the limit of stored energy is relatively small and the stability of vibration is rather poor. For this reason, efforts have been made in the field toward non-linear vibration devices many of which are available today.

Non-linear vibration systems of the prior art, however, have also been less than satisfactory. Certain non-linear springs may stabilize a systems inherent frequency, and achieve larger vibration amplitudes at lower cost of power consumption, but are applicable only in ordinary operating conditions which do not require higher precision and accuracy in directional vibration, or consistent resonance and vibrator stability during fluctuating load conditions in mass, flexibility, and damping. Furthermore, conventional non-linear vibration systems are not suitable for effective operation when a vibration frequency different from the exciting frequency is required, or when it is used to drive a large vibration system. Also, changes in the mass of the external load, in rigidity, in damping, or combined random changes of varying kinds, will result in instability of vibration. For these reasons, the range of applications of previously known non-linear vibration devices have been limited. Alternatively, complicated and costly electrical feedback devices must be employed. Consequently, a complex supplemental system is usually required for providing electrical control or other kinds of assistance to non-linear vibrators of the prior art in order to accommodate operating conditions of the type mentioned above. These complex supplemental systems invariably add to the cost of energy consumption as well as restricting the practical adaptability of the vibrator to different applications by causing the overall structure to be bulky and inflexible.

Although research and development of non-linear vibration systems has had a history of many years; due to the vastness, richness, and variability of this field, a series of fundamental problems remained unsolved prior to the instant invention, including those mentioned above. For example, how many limiting rings of the phase space are there in an ordinary differential system of $n^{th}$ order (i.e. how many basically different stable vibration types are there in a non-linear vibration system which may be described by an ordinary differential equation of $n^{th}$ order)? Of the twenty three problems proposed by Hilbert nearly a century ago, this is the sixteenth one and the one for which the least progress has been made. Although in theory this problem has not been solved thoroughly, the instant invention, in the field of non-linear electromagnetic vibration, provides a practical solution in utilizing selective elastic vibration components of selective parameters and rigidity in combination for effecting a controlled stable vibration, in the absence of complex external electrical supplemental feedback controller devices.

The difficulties suggested in the preceding are not intended to be exhaustive, but rather are among many which may tend to reduce the effectiveness and satisfaction with prior vibration devices. Other noteworthy problems may also exist; however, these presented above should be sufficient to demonstrate that non-linear electromagnetic vibration devices appearing in the past will admit to worthwhile improvement.

OBJECTS OF THE INVENTION

It is therefore a general object of the invention to provide a novel, non-linear electromagnetic vibration device which will obviate or minimize difficulties of the type previously described.

It is a specific object of the present invention to provide a non-linear electromagnetic vibration device without requiring the use of a supplemental electrical controller for regulating and converting vibration frequency.

It is another object of the invention to provide a non-linear electromagnetic vibration device yielding consistent oscillations independent of varying loads.

It is still another object of the invention to provide a non-linear electromagnetic vibration device which is highly efficient in energy consumption.

It is yet still another object of the invention to provide a non-linear electromagnetic vibration device which is highly adaptive for use in varying application environments.

It is another object of the invention to provide a non-linear electromagnetic vibration device which will exhibit precise linear motion without external guides or bearings.

It is a further object of the invention to provide a non-linear electromagnetic vibration device capable of yielding stable and consistent oscillations.

It is yet a further object of the invention to provide a non-linear electromagnetic vibration device capable of consistently maintaining a harmonic resonance state.

It is still a further object of the invention to provide a non-linear electromagnetic vibration device which is highly compact and easily mountable in varying incorporating units.

It is yet a further object of the invention to provide a non-linear electromagnetic vibration device which is essentially frictionless in operation.

It is a related object of the invention to provide a non-linear electromagnetic vibration device which is essentially maintenance free and may be sealed.

It is yet still a further object of the invention to effect any combination of the foregoing objects.

BRIEF SUMMARY OF A PREFERRED EMBODIMENT

A non-linear electromagnetic vibration device as disclosed in an embodiment of the instant invention utilizes sectionalized waveform plate springs of various selectable elastic curvature and overall structural configuration. A plurality of waveform plate springs are sequentially connected and rigidly fixed in respective first and second sectionalized waveform plate spring sets. A first and second vibration part respectively including an electromagnetic armature and core of the electromagnetic source are arranged for fixed connection to said first and second spring sets such that dual cooperatively oscillating structures each of a parallelogram cross-section are formed and are effective to provide precise guiding action during oscillation. Furthermore, convenient mechanical frequency conversion is made available through selective adjustments in the respective masses of the vibrating parts, and the number of plate springs in each sectionalized waveform plate spring set.

BRIEF DESCRIPTION OF THE DRAWINGS

FIGS. 9A, 9B, 9C, 9D, and 9E illustrate various elastic waveforms for selectable edge contours of various sectionalized waveform plate springs.

FIG. 10A illustrates dual cooperatively oscillating structures of a parallelogram shaped cross-section according to the subject invention.

FIG. 10B illustrates the directional motion of the dual cooperatively oscillating structure shown in FIG. 10A.

FIG. 11A illustrates an electrical circuit for supplying working frequency current.

DETAILED DESCRIPTION

Terminology

Figure 1:
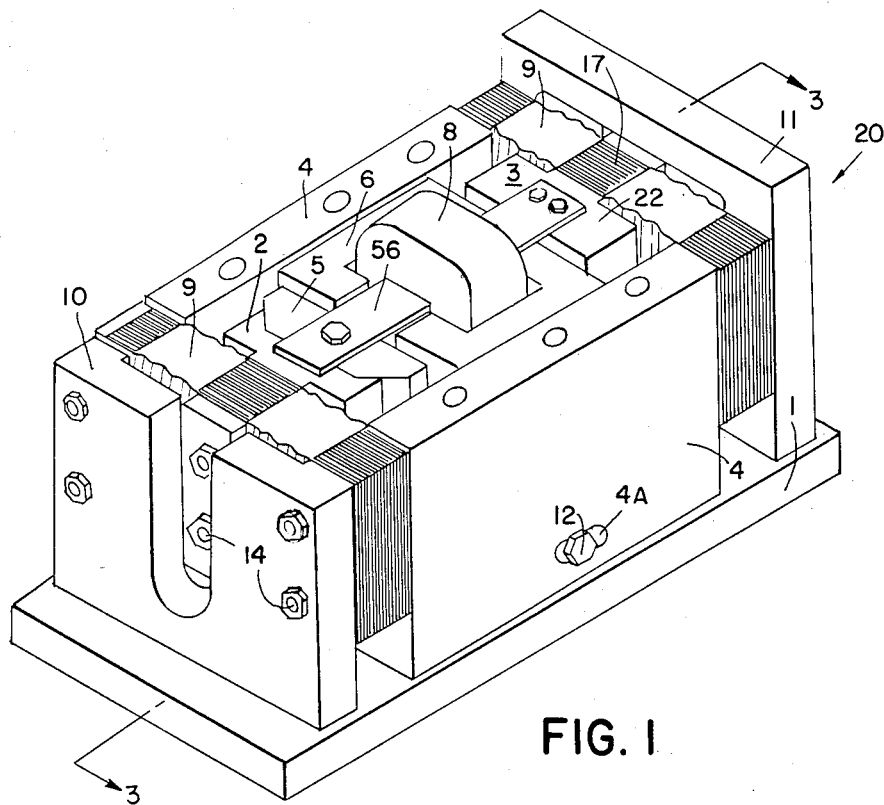
FIG. 1 illustrates a perspective view of a non-linear electromagnetic vibration device according to one preferred embodiment of the instant invention.

Prior to providing a detailed description of various preferred embodiments of the invention it may be worthwhile to briefly establish operative terminology in connection with the subject non-linear electromagnetic device.

In the instant invention the electromagnetic oscillation installation may be regarded as a bipolar oscillating system. The core of the electromagnet and other structures fixedly connected thereto in combination constitutes a first vibrating part of a given mass M1. On the other hand, the armature of the electromagnet and other structures fixedly connected thereto in combination constitutes a second vibrating part of a given mass M2. During oscillation, these two oscillating parts make reciprocating motion relative to their respective static positions prior to such oscillations. The corresponding amplitudes of oscillation of these vibrating parts are inversely proportional to the associated given mass as given by the equation $A1/A2 = M2/M1$ wherein $A1$ and $A2$ represent respective amplitude and $M1$ and $M2$ represents respective masses of the vibrating parts. Of these two vibrating parts, the one of comparatively smaller total mass has comparatively larger amplitude, and is referenced herein as the main oscillating or main vibrating part. The other vibrating part of larger mass and smaller oscillation amplitude is referenced herein as the relative oscillation or relative vibrating part. The total amplitude of the bipolar system, A, is the sum of the main vibrating part and the relative vibrating part amplitudes, $A1 + A2$. If the mass ratio $M2/M1$ is greater than ten (10), that is A1 is 10 times A2, then the whole electromagnetic oscillating system can be regarded as a single proton oscillating system. In this event, the total amplitude value A may be regarded as being approximately equal to A1. Similarly, it is possible to adjust the amplitude ratios of the two vibrating parts by adjustments in their respective mass. Accordingly, depending on the manner of connection of various system components to the electromagnet core or to the electromagnet armature, main and relative vibrating parts of various different mass, configuration, and oscillation amplitude may be formed.

Structure and Operation

Referring now to the drawings wherein like numerals indicate like parts, certain preferred embodiments of the instant invention will be described in detail. In reference to FIGS. 1-4, a non-linear electromagnetic vibration device 20 is shown utilizing sectionalized bellows or waveform plate springs. A laminated magnetic core 6 and core seat 7 of an electromagnet are riveted together. Core seat 7 is connected to lateral frame elements 4 through bolts 12. Lateral frames 4 are connected at respective ends via bolts 14 through sectionalized bellows or waveform plate spring sets 9 to mechanical tuning members 10 and 11 which may serve as balancing weight block type tuning elements for tuning the resonant point of the oscillating system by an increase or decrease in mass. In some instances a top cover 50 may be connected to lateral frames 4 (note FIG. 15). So configured, the core 6, core seat 7, frames 4, weight block members 10 and 11, and an optional top cover (see FIG. 15), and all connecting bolts and coupled portions of the sectionalized bellows spring sets 9 together constitute a first oscillation or vibration part or collective mass. Tuning members 10 and 11 are primarily effective near the resonance state, are mounted via screws 14 on the outside of sectionalized waveform plate spring sets 9 and are operative to enable the entire vibration assembly to remain persistently near a primary and/or lower order resonance states.

Figure 2:
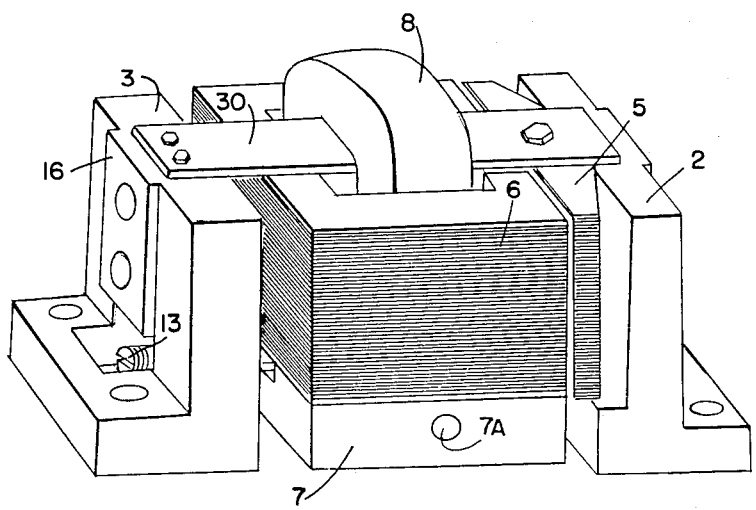
FIG. 2 illustrates a section of FIG. 1, rotated approximately 180°, and discloses an electromagnet and armature supporting block.
Figure 3:
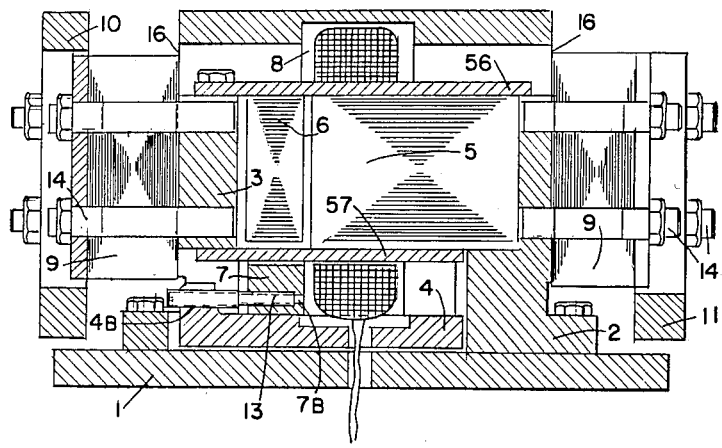
FIG. 3 illustrates a longitudinal partial cross-sectional view taken along section line 3—3 in FIG. 1.
Figure 4:
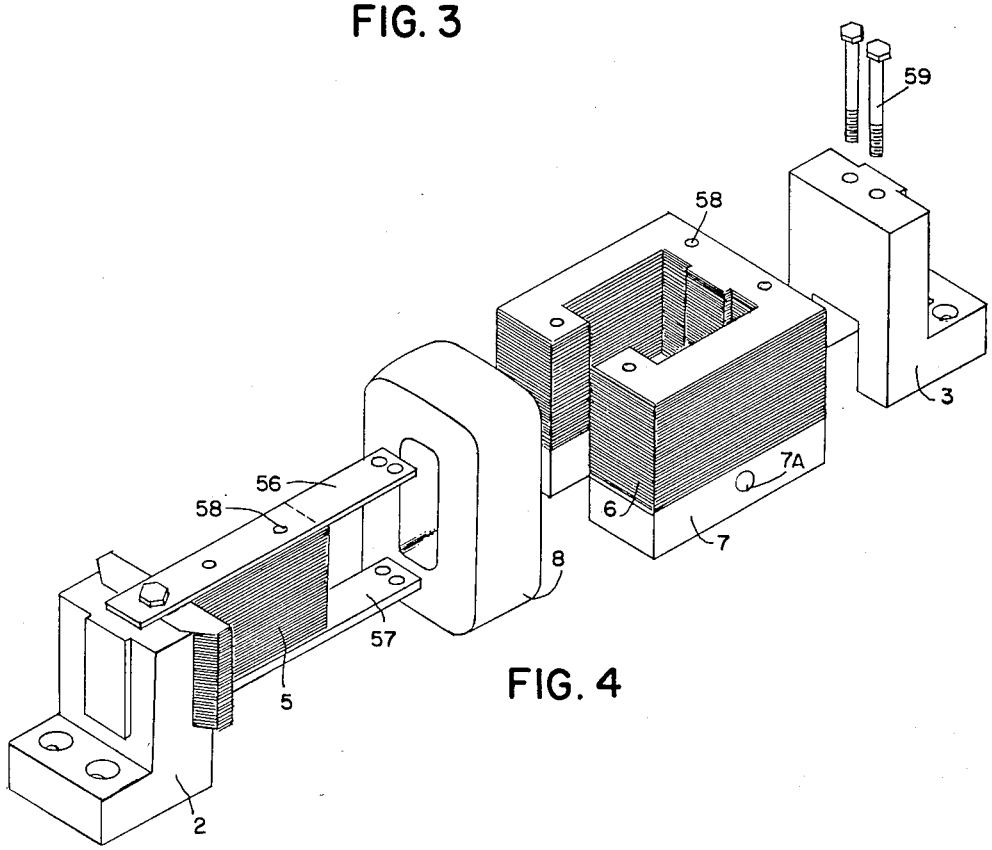
FIG. 4 illustrates an internal exploded axonometric view of the elements shown in FIG. 2, which has been rotated approximately 180°, with respect to the view shown in FIG. 2.

An exploded view of a central area of FIGS. 1-3 is particularly shown in FIG. 4. Armature 5 is formed from riveted and plied metallic material, T-shaped, and fixed to upper support plate 56 and lower support plate 57. The plates 56 and 57 are bolted and soldered to front and rear support members 2 and 3 positioned adjacent opposing sides of the magnetic core. The plates 56 and 57 extend through a magnetic coil 8 which is operably disposed within the magnetic core 6. The armature is externally tightly encased by coil 8. This arrangement is more clearly illustrated in FIG. 3. Front and rear supports 2 and 3 are fixedly connected to a base plate 1, and also to a portion of a respective sectional spring-set 9 via bolts 14 (note FIG. 3). So configured, armature 5, coil 8, support members 2 and 3, base plate 1, upper and lower connecting plates 56 and 57, all connecting bolts and portions of sectional spring-sets 9 connected thereto together constitute a second oscillation or vibration part of collective mass.

In the arrangement described above, the first vibrating part including the magnetic core has a larger mass than the second vibrating part which includes the magnetic armature, and therefore has a smaller vibration amplitude relative thereto. Thus, the second vibrating part including the armature, and having a larger vibration amplitude, is referred to as the main vibrating part, and the first vibrating part including the core and having a lower vibration amplitude is referred to as the relative vibrating part. The terminology as applied is dependent upon the relative mass and vibration amplitudes of the two vibrating parts, and may be reversed if the relative mass and amplitudes are different in alternative embodiments. Different structural connections of various components in distinct embodiments of the instant invention may yield many combinations of main and relative vibrating parts. For instance, the lateral frames 4, instead of the front and rear support plates 2 and 3, may be connected to the base plate 1 in an alternative embodiment and may or may result in a reversal in relative collective mass and vibration amplitude. It is possible to adjust the size ratio of comparative amplitudes through adjustments in mass ratio, in order to meet the requirements of varying applications.

A vernier bolt 13, shown in FIGS. 2 and 3, has front and rear sections of different screw pitch. The front screw section is adapted to the bore 7B on armature base seat 7, and the rear screw section is adapted to the bore 4B on a protruding central part of the bottom of frame 4. Turning of vernier screw 13 will cause the riveted core 6 and core base seat 7 to advance or retreat relative to the frame 4. Because the frame 4 is at a static position when not oscillating, it does not vary in relation to the armature 5. In this manner, an adjustment via turning the vernier bolt 13 effects an adjustment of the size of air gap between the core 6 and the armature 5. Locking bolts 12 are also shown for fixing the core 6 to the frame 4; they are symmetrically mounted on opposing sides of the arrangement. Each bolt 12 passes through a bore 4A on a corresponding side wall of frame 4, and turns into the bore 7A on core seat 7. It physically connects the frame 4 with the core seat 7. When it is necessary to adjust the airgap of the electromagnet, one must first loosen locking bolt 12. The presence of elongated bore 4A permits the above described adjustments in the electromagnet air gap. Upon completion of the air gap adjustments, bolt 12 is retightened in order to fix the core 6 in its new position relative to the armature and frame.

Figure 5:
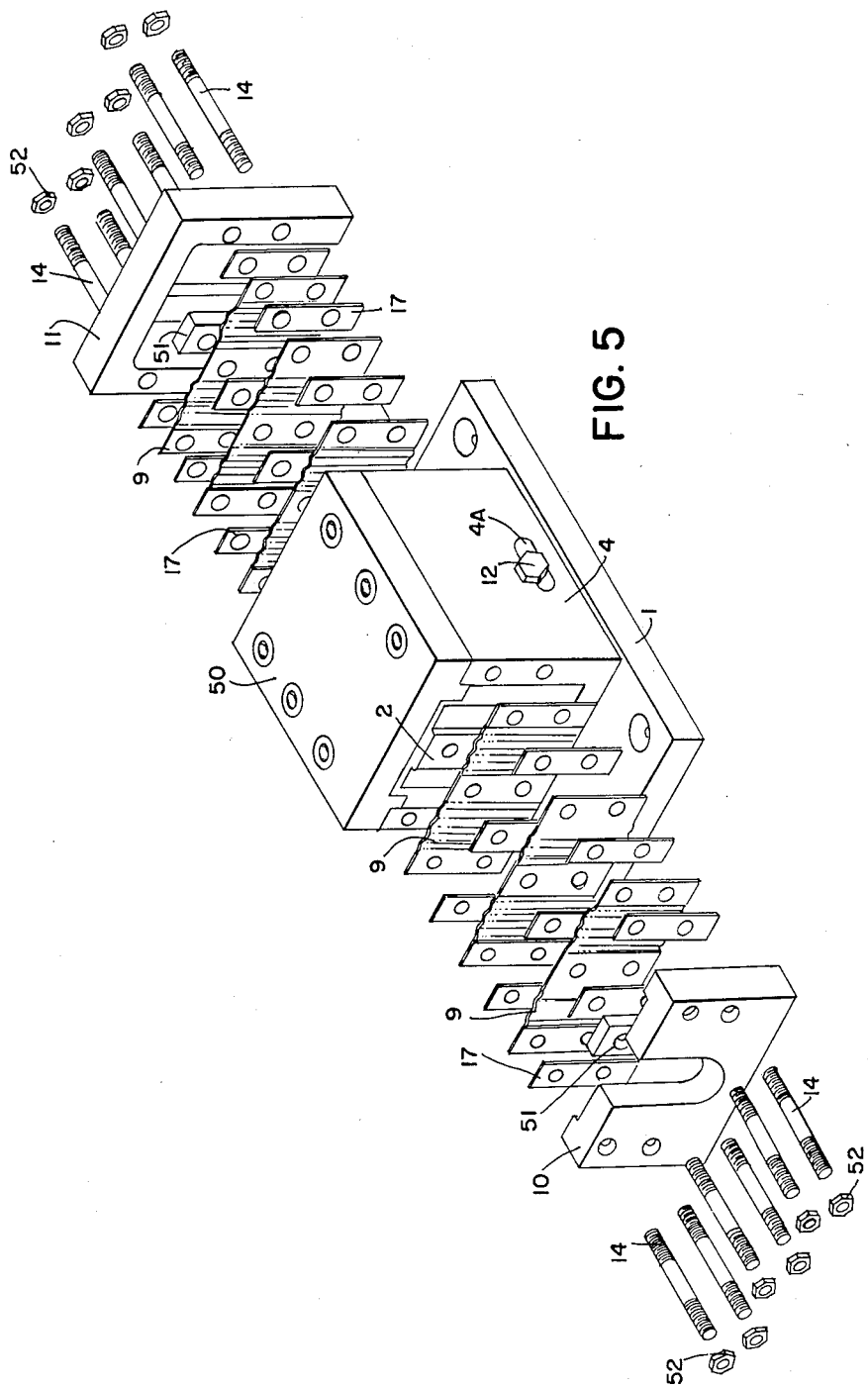
FIG. 5 illustrates in an exploded and axonometric view of the manner of connection of sectionalized waveform plate springs.

The respective manner of connection between the main and relative vibrating parts and the sectional band spring sets 9 is illustrated in detail at FIG. 5. Nuts and bolts 52 and 14 fixedly couple respective mid portions of each sectional band spring set to the main vibrating part, and respective end portions of each sectional band spring set to the relative vibrating part. In alternative embodiments, this connection may be reversed such that the mid portion of the plate spring sets is connected to the relative vibrating part and the end portions to the main vibrating part. In this Figure, a top structure 50, as referred to above, is also shown. Each sectional band spring set includes a series of sectionalized plate springs separated by shims 17 which prevent friction during oscillating motion of the springs. In the disclosed embodiment, three shims are disposed between each adjacent pair of sectionalized plate springs.

Figure 6:
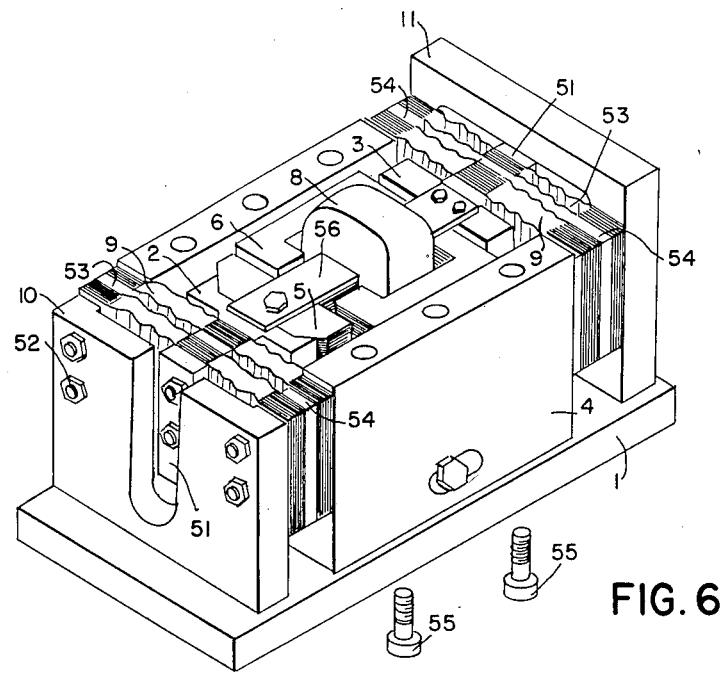
FIG. 6 illustrates a perspective view of an alternate preferred embodiment of the instant invention.

In FIG. 6, an alternative embodiment is shown wherein a second sectional band spring set 53 is attached to each original spring set 9 on each side of the assembly. Separators 54 are respectively disposed between spring sets 9 and 53. In addition, screws 55 are shown, which may be used to fix the frame 4, instead of end pieces 2 and 3, to bed plate 1.

Figure 7:
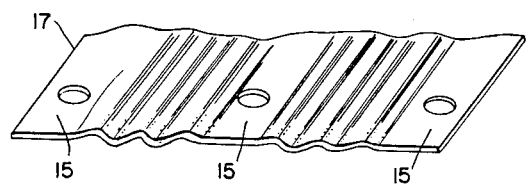
FIG. 7 illustrates an axonometric view of a portion of a sectionalized waveform plate spring.

The construction of sectionalized bellows (or waveform) plate springs 17 is illustrated in FIG. 5, and also in FIG. 7 which shows a half portion of a single sectionalized plate spring. On the center and two sides of each plate spring 17, a respective mounting plate 15 having two tap-holes thereon is located (FIG. 7 shows only half a spring). In each tap-hole, a stud screw 14 is placed for means of coupling. Successive plate springs are pressed together via stud screws, front and rear support members 2 and 3, and press bars 51. Intervening washers or shims may be disposed in between one plate spring and the next. In the embodiments described above, the mounting planes at the ends of each plate spring are coupled to opposing side walls of the frame 4, and a central mounting plane is coupled to a corresponding front or rear support member 2 or 3.

Figure 8A:
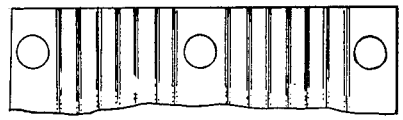
FIGS. 8A, 8B, and 8C illustrate various shapes of each sectionalized waveform plate springs in accordance with the invention.
Figure 8B:
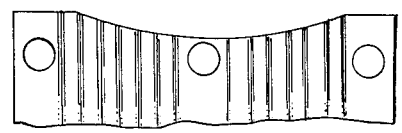
Figure 8C:
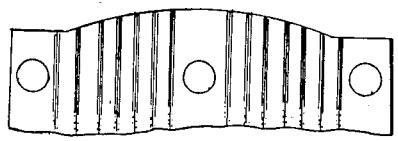

The sectionalized bellows (waveform) plate spring sets are non-linear elastic components. The non-linear characteristics may be conveniently selected and designed to suit different application environments. FIGS. 8A, 8B, and 8C illustrate a half portion of several alternative designs of such plate springs. As can be seen, the spring may have an edge which is straight or curved to be concave, or convex in shape. Each spring set may include a combination of such plate springs successively arranged as presented above. FIGS. 9A, 9B, 9C, 9D, and 9E illustrate respective edge diagrams of such plate springs. These edges may be made to satisfy various sine, exponent, or other functional curves which reflect a corresponding elastic behavior of the spring. In the overall vibration assembly, each waveform plate spring of one configuration may be used in combination with waveform plate springs of the same or other kinds to suit the particular requirements of different application environments. These sectionalized plate springs have smooth non-linear characteristics and a wide range of potential behavior in combination to support a correspondingly wide range of desirable flexibility and rigidity. There is very minimal internal damping, and a very long fatigue life. The plate springs provide high precision in directional motion, and high adjustability for self-adapting control. In all these aspects the subject invention manifests optimal performance in comparison with common linear springs, sectionally linear composite springs, and other existing non-linear springs.

The number of waveform plate springs in each spring set 9 may be varied and selectively adjusted to vary the vibration frequency responsive to an exciting frequency from a source. If the number of plate springs is raised to equal the square of an integral times the number required for a harmonic response, the vibration frequency may be multiplied a corresponding integral times. Similarly, if the number of plate springs is made to equal the square of an inverse integral times of the number required for a harmonic response, then the vibration frequency can be made to equal an inverse integral times of the exciting frequency. In this manner, frequency conversion and multiplication under harmonic resonance can be achieved via mechanical adjustments of the number of plate springs. The need for a complex electronic frequency converter is completely eliminated. With the subject vibration assembly, the resonance state can be persistently maintained under no load, or varying rated load conditions. The concept is based on the unique characteristics of strong non-linear systems in being able to generate harmonic resonance. The spring-set stiffness may be varied by varying the number of plate springs, and thus can be made to equal the square of an integral or of an inverse integral times the degree of stiffness under harmonic response. The inherent vibration frequency may be raised an integral times or an inverse integral times by combined adjustments in the mass of vibrating parts and the vibration stiffness. Accordingly, the subject vibration assembly is able to achieve harmonic resonance characteristics in mechanical vibration as in non-linear electromagnetic wave vibration. The instant device enables frequency multiplication and frequency conversion of harmonic response to be achieved for resonance type mechanical vibration without requiring an independent electronic frequency converter device.

When the vibration device is activated, and electrical exciting current flows through coil 8 (note again FIG. 3), pulsed attraction is generated by electromagnetic action. The spring-sets are correspondingly elastically flexed in unison towards a common direction along a linear axis parallel to the longitudinal axis of the upper connecting plate 56. Because the springs are sectionalized, and because opposing ends of each section of each plate spring are couple to different vibrating parts, main and relative, as discussed above, two self-reciprocating parallelograms are formed which share a major side along an axis parallel to the central longitudinal axis of the upper connecting plate 56. Each side wall of frame 4 constitutes the other major side of each parallelogram, and a corresponding section of each plate spring collectively forms every minor side of each of said two parallelograms. As shown in FIG. 10A, parallelogram A is reciprocating in direction of arrows A' while parallelogram B is reciprocating in unison in the direction of arrows B', and both parallelograms share a common edge along an axis parallel to the central longitudinal axis of the top plate 56. This arrangement is more particularly illustrated in FIG. 10B, wherein the parallelograms A and B are schematically shown apart from the underlying structure, and cooperatingly reciprocate in unison. The dashed lines illustrate successive positions of the parallelograms during oscillation. In this manner, a highly stabilized cooperative reciprocating motion is achieved together with precise linear guiding action between the corresponding parallelogram structures.

The cooperatingly reciprocating dual parallelogram stucture of the instant invention provides highly accurate and precise directional reciprocating linear vibration without use of external guiding structures. In the absence of external guiding structure, guiding friction and wear are eliminated. The dual reciprocating parallelogram structure manifests a guiding influence on each other to ensure stable cooperative oscillations. Without requiring external guiding structures for stable and precise vibration, the instant vibration assembly has a greatly expanded range of application and may even be enclosed within a sealed container as no maintenance is required.

When resonance motion takes place in non-linear type electromagnetic vibration facility of this invention due to the in-flow of resonance exciting current, the iron core of the electromagnet and the mass of parts rigidly connected with it as well as the armature of electromagnet and massof parts rigidly connected with it exhibit a relative motion with each other. As noted above, the amplitudes are distributed inversely proportional to the ratio of relative mass of the two parts.

In one embodiment of this invention, frame 4, upper cover 50 and other members are connected with the iron core 6 of electromagnet and the whole structure is located outside the structure of armature of electromagnet front support seat 2, rear support seat 3 and other members. So, in the whole vibration machinery, if the total mass of members, and parts rigidly connected to the iron core of electromagnet compared with the total mass of members and parts rigidly connected to the armature of electromagnet is smaller, then the amplitude produced in the electromagnet iron core and members rigidly connected with it will be larger than that produced in electromagnet armature and members rigidly connected to it. Thus, the former structure will become the main resonance part of the vibration system. Such electromagnetic vibration facility may be referred to as an external relative motion type electromagnetic vibration facility.

Figure 11B:
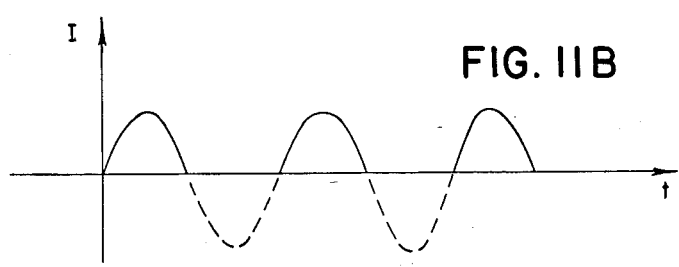
FIG. 11B, note sheet 8, illustrates the waveform of current supplied by the circuit of FIG. 11A.

When the working frequency current through half-wave rectifier flows in the facility according to the electric circuit shown in the example of FIG. 11A; the waveform of current is shown in FIG. 11B. During the positive half wave cycle, current passes through electromagnetic coil 8. Electromagnetic attraction force is produced between electromagnet iron core 6 and magnet armature 7, thus enabling the iron core 6 together with the iron core base seat 7, frame 4, upper cover and other members rigidly connected to it to drive both ends of the front and rear sets of bellows plate-spring groups 9 and to produce motion relative to the armature 5 which is rigidly connected on the base-plate 1 and front and rear support seats 2, 3, thus, reducing deformation in the bellows plate-spring group and storing a certain amount of elastic potential energy. During the negative half cycle, no current flows through electromagnetic coil 8, and electromagnetic attraction forces diminish (dissipate). The iron core system, under the action of a recovering spring force is released from the armature 5 and moves in an opposite direction. With periodic motions, the main resonance part of the vibration system produces fixed direction reciprocating vibration at a frequency of the working frequency current. By adjusting the air-gap adjustment bolt 13 and making the distance of air gap between iron core 6 and armature 5 a little larger than a half amplitude of fixed direction reciprocating vibration, it is possible to prevent the possibility of a collision of iron core 6 with armature 5 in motion, and assure the production of maximum electromagnetic attraction force. Because of the non-linear elasticity characteristics of a bellows type plate-spring group 9 which may produce pulse type non-linear motion characteristics, the number of spring pieces in the bellows type plate-spring group can be adjusted to vary the total rigidity of the vibration system and to realize one and more than one harmonic resonance. Utilizing characteristics and control and adjustment operations substantially as described above it has been determined that when the frequency of vibration reaches 3000 times/min., the total amplitude reaches 4 to 6 mm.

Advantageously it is also possible, with the instant invention, to vary the amplitude of the vibration by varying the input voltage.

Figure 12:
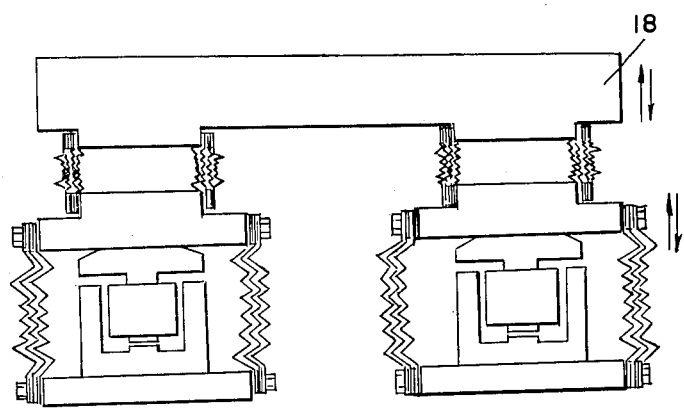
FIG. 12 illustrates a dual vibrator push-pull resonance assembly in accordance with the invention.

FIG. 12 illustrates a dual vibrator push-pull resonance state. Two small-scale electromagnetic vibrators each with power of 100 watts are used. Their respective coils are fed through the same power wire to enable synchronous vibration movement and to form a push-pull cooperating relationship. The vibrators work in unison and are able to drive a large working body 18 of large mass and inertia. In this manner, the subject invention employs small-scale vibrators in cooperation for driving a massive working body. In so doing, the subject invention reduces the required size of the vibrating assembly and also the otherwise required stiffness of the working body. The dual 100 watt vibrators acting in unison are able to generate the practical effects of a large 500 watt scale vibrator, thus achieving a significant increased efficiency with reduced power consumption. Push-pull resonance can not be achieved with conventional revolving link exciters and vibrators or inertia type exciters and vibrators, because these type of devices can not be strictly synchronized. The subject invention is able to employ a single power source for driving a plurality of electromagnetic vibrators so as to ensure that they function in a resonance state with the same frequency and at the same phase.

A modified version of the external relative motion type electromagnetic vibration facility mentioned above exists in an internal relative motion type electromagnetic vibration facility. If the total mass of the electromagnet iron core and the members and parts rigidly connected to it is compared with the total mass of electromagnet armature and the members and parts rigidly connected to it, and the former one is greater, then the amplitude obtained by the iron core system will be relatively smaller than that obtained by the armature system and the iron core system becomes the relative vibration part, while the armature system becomes the main vibrating part.

In a preferred embodiment of the instant invention a solenoid type electromagnet is utilized. In comparison with a common n or E type electromagnet, the solenoid type has a larger electromagnetic attractive force and travel, and is much easier to connect its two ends to double elastic components, and to carry out position fixing and air gap trimming. In addition, the structure of the entire electromagnetic vibrator is made powerhead-like so that it is easy to connect to and maintain. The core, upper cover and adjoining frame to the core, the armature, and front and rear support blocks of the armature all can be used as the unit for producing the principal vibration. In this manner, the structure can be employed flexibly and mechanical vibration can be sent out conveniently through attachments with simple connecting parts at a number of alternative positions.

A significant breakthrough in the technical field of non-linear vibrating machines made by the present invention lies in the fact that subject springs have been selected to exhibit exponential/sine waveforms. A curve for shifting its standard rigidity is determinable and the parameters for the springs optimal working characteristics are conveniently selectable. This type of non-linear vibration not only depends upon the average rigidity of the vibratory elastic component but has also a close relationship with its rigidity curve and structural damping. The exponential/sine waveform spring adopted in the present invention has smaller structural damping than other springs and the relationship between stress and strain is approximately a logarithmic function.

Let "f" be the stress and "l" the strain. Then $$l = \alpha \ln(1 + \beta f),$$

where $\alpha$ and $\beta$ are parameters which can be determined by the method of least square from experimental data. Conversely, "f" can be written as an exponential function of the strain:

$$e^{\frac{l}{\alpha}} = 1 + \beta f$$

$$\therefore f = \frac{1}{\beta}\left(e^{\frac{l}{\alpha}} - 1\right).$$

Its rigidity function is found to be $$\frac{df}{dl} = \frac{1}{\alpha\beta} e^{\frac{l}{\alpha}}.$$

Calculations by microcomputer show that the vibration type non-linear spring with such rigidity function exhibits a stable periodic vibration (under rather extensive external force conditions and for certain amplitudes). The computer has also drawn out its stable limiting rings of the phase space under various parameter conditions.

Even with an elastic vibration component of excellent performance, normal operation of a vibrating machine still cannot be fully ensured with conventional systems. This is because external conditions may vary in different ways when the machine is in operation. Thus, for example, when it is used for cutting, the damping in cutting would vary with the change of the hardness and dimension of the work piece being cut; when it is used for conveying and sifting of material, the quantity and variety of the material would entail change in the vibrating mass; and when it is used in compressing gases (vibratory compressor), which is equivalent to attaching a gaseous spring, the change of rigidity curve would arise. The change in these conditions would affect the type of respective vibrations and may cause them to transfer from the near resonance area to the far resonance area and to come out of stable limiting rings and get into a non-stable state, with the result that the vibrating machine either could not operate normally or would exhibit reduced performance during operation.

The present invention has effected three kinds of vibration control, viz:

Damping control (stability control for varying damping);

Rigidity control (stability control for varying rigidity); and

Mass control (stability control for varying mass).

The fundamental principle of control is the method of feedback function, i.e., a preset feedback (self-compensating) function is to be formed by designing electromagnetic, elastic, and mass damping systems. Once the working conditions of a vibrating machine undergoes a change within a certain range, the feedback function would automatically play a role to control and offset the change in external conditions so that the machines may continue to work normally.

The feedback function is implemented by the following procedures:

(a) Procedure of Electromagnetic Feedback

As the amplitude of vibration decreases with the increase of external damping, the velocity of vibration, and, therefore, the resistance of the coil, is reduced, leading to the increase of the current. The result is the increase of the amplitude. This control effect is called electromagnetic feedback, which is particularly manifested as the increase of power with increase of external damping (working damping). To exploit the feedback effect to the utmost, the present invention has made the optimum selection of the gap between the electromagnet and yoke and has used a plug-in yoke so that the maximum feedback effect can be obtained without any collision. The hard spring which the present invention has adopted causes the vibrating body to reduce its velocity abruptly when it reaches the limiting position, which also contributes to the maximum exploitation of this control effect. Moreover, in the design of the coil-rectifier circuit, various forms such as full-wave, full-wave rectification, half-wave rectification, and "full-wave (electromagnet)×full-wave rectification (yoke)" may be employed to meet different working requirements.

(b) Procedure of Preset Stress

In the course of the design, working area, i.e., near resonance, is chosen not only according to the curve of the elastic component, but by matching the selection of parameters the component is made to work outside the working area. Once either the external damping or the mass increases, the elastic component would return from the outside to the inside of the working area. The resonance force inside the working area would assist to compensate for the deterioration of external conditions so that the machines can operate normally.

(c) Procedure of Auxiliary Springs

In the design of vibrating machines, beside the elastic component producing the principal vibration, several sets of auxiliary springs may be installed to meet any possible variation of external conditions. When external changes interfere with the mass and rigidity, these auxiliary springs, would to varying degrees, play a part automatically, resulting in compensatory changes in the rigidity of the vibration system so that the machines can operate normally.

The above control procedures may be used either separately or jointly with one or more of them together. In a specific design, differential equations may be formulated on the basis of test data to be solved by simulation and, if necessary, a computer may be used for optimizing operating conditions.

Bellows (Waveform) Type Plate Springs

Non-linear rectangular bellows type plate spring group is a generally significant operating element of the subject invention by which the main characteristics of the electromagnetic vibration facility and hence, those of the vibration machinery using such facility as its power source are determined.

The main characteristic of this element is the application of thin bellows type plate spring pieces with a generally rectangular outer dimension, and separate segment sine configuration or exponential function and the spaced lamination of such plate springs into a group. Each bellows type plate spring piece has an assembly hole or separate segment assembly plane, so as to use a bolt for fixing and restraining it. Aluminum washer shims may be used between these assembly planes, so that friction may be avoided, when deformation between plate springs is produced.

The main characteristics of the subject bellows type plate springs may be described in some detail as follows:

(a) Constructed by Thin, Rectangular Plate Spring Piece

A conventional plate spring piece used in electromagnetic vibration machinery is constructed by a thick (2 mm) rectangular plate spring piece. There is neither a bellows configuration nor assembly hole on it. The pieces are used in a non-fixed-restraint mode, with the plate spring laminated in a group, and comprising elastic elements with linear elastic characteristic. There were also previously known single-piece, thick, circular plate spring pieces with concentric circle series washer elements, forming a non-linear characteristic or deformation with separate segment linearity to a definite stage and thereafter presenting a non-linear characteristic.

The bellows type plate spring of the subject invention is composed of thin, generally rectangular plate spring pieces.

Each bellows type plate spring piece is generally 0.3-1.5 mm thick. To compare the thin type plate-spring piece with thick type plate-spring piece, we find that the internal damping of the former decreases exponentially, when they are laminated in a group and used. Total damping is still less than that of a comparatively thick type plate-spring piece with the same rigidity, but the strength of the transverse beam constructed by the former increases with the increase in total area of cross section. In comparing rectangular bellows type springs with disc shape bellows type springs or with rectangular plate springs, it is found that the internal damping determined by the construction factor is also much smaller. When a generally rectangular bellow type plate spring is in the state of working deformation, deformation in a rectangular bellows type plate spring through the bending or twisting action on a vertical line of the bellows may be much higher than that of various conventional plate springs (such as rectangular, non-bellows or disk shape, bellows plate springs) and that of rubber springs under the same action force; yet, in the direction of non-working deformation, there is very large mono-directional rigidity. Therefore, when the subject invention is used in a vibration facility, and vibration motion is produced, both large vibration amplitude and high orientation is obtained.

Each generally rectangular plate spring may have a shaped outer dimensions, such as straight, convex or concave, as illustrated in FIGS. 8A, 8B, and 8C.

(b) Vertical Bellows With Sinusoidal Configuration Or Exponential Function

As mentioned above, with generally rectangular bellows type plate spring pieces, the vertical bellows has a unique influence upon reducing the structural internal damping and assuring correctly oriented motion. Furthermore, there are various kinds of cross-sections of the bellows, whatever the overall outer dimension of the plate spring, such as sinusoidal configuration type, exponential function type and other different forms of bellows type cross-section. These kinds of plate spring pieces have excellent longevity in the fatigue type working state, because the deflection curve is very smooth and the rate of variation may approach an infinitesimal value.

(c) Continuous Non-Linearity of the Elastic Characteristic Curve and the Versatile Selectivity of the Curve The elastic working characteristic of the vertical, bellows type spring piece of this invention presents the variation of continuous-non-linearity within the entire scope of working deformation from start to end. Many kinds of conventional non-linear springs, such as a non-cyclindrical spiral spring and so on, usually enter a region of non-linear characteristics only after they have been deformed to a specified extent, and some other non-linear springs, such as linear plate springs, non-linear spiral springs and some combinations of such springs constitute a non-linear characteristic curve by exhibiting separate segment linear characteristics. The generally rectangular, bellows plate spring of the subject invention not only has a pronounced, continuous, complete curve of non-linear elastic characteristic, but also may selectively obtain many different kinds of characteristic curves of non-linear elasticity through changing the design parameters of plate-spring, such as its outer shape, thickness, different bellows shape cross-section elastic waveform, depth of each bellow trough and different techniques of heat treatment. A transistor triode can be used as an example to explain the above mentioned situation. Every kind of transistor triode has its own amplification characteristic curve which may be selected according to a technical specification, and therefore, may satisfy different technical requirements of usage and control. Particularly, in the state of different external load fluctuations, if the proper curve of non-linear elasticity character can be designed and selected, then proper non-linear feed-back characteristics can be achieved to maintain the stability of vibration of the entire system.

(d) Fixed Restraint

The generally rectangular, bellows plate-spring group of the subject invention is different from conventional plate-spring groups. It adopts an assembly mode of fixed restraint with assembly holes which differ from that of conventional, single, non-linear springs. In addition, it utilizes a method of spaced lamination in a group for use, so, springs of this invention has both the characteristic of non-linear elasticity as well as versatile and unique modulation characteristics. The total rigidity of the vibration system can be modulated by increasing or reducing the number of pieces of the bellows plate-spring sets, to realize one order harmonic resonance or multiple order harmonic resonances. Under the conditions of resonance, owing to the above-mentioned characteristics of low internal damping and non-linear motion of the spring of the instant invention, it is possible to obtain much larger resonance amplitudes and spontaneous acceleration characteristics than those of previously known linear and non-linear electromagnetic vibration facilities. Therefore, the energy consumption per unit of vibration strength decreases considerably, and a novel harmonic resonance type double frequency variation method is thus formed.

To summarize, non-linear rectangular bellows plate spring group of this invention has main characteristic of fixed restraint in application, such as, separate segment sine configuration type or exponential function type bellows plate spring with thin and rectangular outer shape and laminating in group, therefore, its elasticity characteristic curve has continuous non-linearity and versatile selectivity of characteristic curve. When it is used in electromagnetic vibration facility or various kinds of vibration machinery, if compared with any known linear or non-linear spring, it may obtain the best and the most stable performance characteristics of vibration in many respects, such as: convenience in design, selection and test of characteristics curve of non-linearity, minimum internal damping, large amplitude, large spontaneous acceleration and high precision orientation, one or more than one harmonic resonance, realization of double frequency variation of excited resonance, as well as high strength and long fatigue-resistant duration time.

Solenoid Type Electromagnet

A conventional electromagnetic vibration unit typically uses a shape "E" shape or "H" shape electromagnet. An electromagnetic vibration facility of this invention uses a solenoid type electromagnet wherein the armature is generally T-shaped and an electromagnetic core is generally U-shaped which may better concentrate its electromagnetic attraction in the magnetic field. Furthermore, the electromagnet of the instant invention is made to include unique electromagnetic elements. Silicon steel sheet of high silicon content is used to replace that of low silicon content as a basic material of the electromagnet. In this manner, larger electromagnetic attraction forces can be obtained than that of a conventional unit. In addition, dual reciprocation structures of parallelogram shaped cross-section can be easily constructed to include both front and rear sectionalized waveform plate spring sets on opposing sides of the electromagnet so as to assure a high precision fixed direction motion of the vibration system during system operation.

Structural Configuration (a) Fixed Direction

The instant invention has solved a problem of how to assure a high precision of fixed direction motion. The subject invention uses generally rectangular, laminated bellows plate spring groups which exhibit an excellent property of fixed direction deformation. Moreover the instant structure exhibits a fixed restraint mode in the whole structure of the electromagnetic vibration facility. Mounting the plate-spring groups 9 in a fixed-restraint mode on transverse beams 4 and the front-rear double group support seats 2 and 3 which has a high degree of rigidity forms a stable parallelogram structure which can maintain high precision fixed direction motion, without any need for mechanical guiding structures, such as a guideway. Since there is no friction between a guideway structure and the vibrating unit, the working parts in vibration motion can achieve a comparatively high precision in movement without friction losses, and the scope of the application of electromagnetic vibration facility may be enlarged.

(b) Fixed Restraint Mode of Non-Linear Bellows Plate Springs

Plate spring pieces of a conventional plate spring type electromagnetic vibration device are assembled in non-fixed restraint mode. Several sets of clamping bolts are used to clamp the plate spring group together with washer pieces between plate spring pieces on the electromagnetic vibration facility. Accordingly, the performance characteristics of the whole machine may be easily influenced or disrupted by the clamping operation, deformation of the washer pieces, temperature variation and so on. In the instant invention there are assembly holes punched on the assembly plane in several separate elements of the bellows plate-spring element and clamping bolts are used to fit through these holes and clamp the bellows plate-spring group tightly to the frame and support seats of the electromagnetic vibration facility in a fixed-restraint mode. By doing so, not only is stable vibration performance characteristics assured, but motion characteristic of non-linearity can also be assured.

(c) Micro-Adjustment Mechanism For Air-Gap in Electromagnet

In previously known electromagnetic vibration devices, it was necessary to adjust and fix the air gap between an electromagnet iron core and an armature by several sets of bolts which connect the electromagnet iron core with a machine body. By this method, it was difficult to make precise synchronous micro adjustments. It was inconvenient to operate and it was easy to disruptively influence the uniformity of the electromagnetic attraction force over the whole air gap.

In the structural concept of the electromagnetic vibration facility of this invention, a base seat 7 is riveted onto an electromagnet iron core. The base seat 7 forms a slideway with an internal wall of machine frame 4 in the direction of its width. Then, a differential motion bolt 13, which has two segments of screw thread with the same lead direction but with different pitch, is connected with iron core base seat 7 and machine frame 4 respectively, to permit micro-adjustment of the electromagnet air gap. Only a differential motion bolt is needed to complete the micro-adjustment motion which is the difference of two different pitches for one turn of screw thread. In addition, proper fit of the slideway along its width direction between the base seat and machine frame is provided to assure high precision synchronous micro-adjustment, and at the same time, to assure the uniformity of electromagnetic attraction force over the whole air gap.

(d) General Structure of the Dynamic Head

The non-linear electromagnetic vibration device according to preferred embodiments of this invention are provided with a versatile assembly base plate. A dynamic head is installed in conformity with an outer dimension and general design of an incorporating facility. Very minimal expense and little machine processing is needed to make the vibration facility fit for many different purposes and such structure makes design and manufacture convenient and enables the facility to be compact in construction, small in volume, low in energy consumption and use of materials.

(e) Simple Electrical Layout

When conventional linear type electromagnetic vibration facilities are used in various kinds of vibration machinery, under the conditions of variable external loads, it is typically necessary to add and use a complicated electric control mechanism to maintain the stability of its performance characteristics.

In the instant invention when the non-linear, electromagnetic vibration device is used in various kinds of vibration machinery under conditions of variable external loads, it is possible to depend on self-feedback of non-linearity to obtain a stable performance characteristic. Therefore, from the viewpoint of structure, the electrical layout of the instant facility is very simple in construction, and reliable in operation.

Control and Adjustment (a) Control and Adjustment of Performance Characteristics of One or More Than One Harmonic Resonance In conventional linear and non-linear electromagnetic vibration facilities, only the form of a base wave resonance can be used for performing resonance control and adjustment.

According to the instant invention, harmonic resonance can be produced by adjusting the total rigidity of the non-linear spring sets in the vibration facility. Moreover, through an adjustment of the number, size, bellow shape, and heat treatment of the springs, the total rigidity can become the square of an integral fold or square of a fraction of an integral fold of the predeterminable rigidity in harmonic response. A simultaneous adjustment of the vibrating mass and the total rigidity of the vibration system can yield a vibration frequency higher than that in base wave resonance by an integral fold or a fraction of an integral fold. Therefore, harmonic resonance characteristics traditionally achieved via supplemental electrical controllers can be obtained mechanically. In this manner, frequency variation for excited resonance frequency can be realized without adding any frequency variation electrical devices.

By adjusting the number of plate springs in one or more sectionalized waveform plate spring set to equal the square of an integral (n) times a number predeterminably required therein for the vibration device to achieve harmonic response, one can yield an integral (n) times the vibration frequency of the source as the operating vibration frequency of the device. Similarly, by adjusting the number of plate springs in one or more sectionalized waveform plate spring sets to equal the square of an inverse integral (1/n) times a number predeterminably required therein for the vibration device to achieve harmonic response, one can yield an inverse integral (1/n) times the vibration frequency of the source as the operating vibration frequency of the device.

An example of a determination of the number of spring plates is illustrated below:

The number of plates may be obtained by using the following equation $$(1)\ W(\chi)=\sqrt{K(\chi)/m}$$

Where
W($\chi$) is the operating frequency of the system.
$\chi$ is the amplitude.
m is the inertia mass in operation.
K($\chi$) is the spring characteristic.

Once K($\chi$) has been determined, the number of plates can be determined according to this equation.

The wave shape and the plate form are important to the spring characeristic design. The spring design can be solved theoretically as well as experimentally. The spring characteristic depends on the wave shape, the number of waves, the form of the plate and the applied constraint conditions. The spring design must meet the following requirements:

(1) The spring characteristic must comply with the vibration characteristic.
(2) The spring fatigue life must satisfy long-term operating conditions.

As the applications of springs are extensive, springs used on various vibrating machines may be different from each other. Various springs may be designed qualitatively according to the following comments to determine their parameters, then modified by routine experiments.

I. Spring Characteristic
Using the following terminology:
K($\chi$) is the spring characteristic
r is the radius of wave shape
S is the plate thickness
b is the plate width
l is the plate length
n is the number of waves
The spring characteristic K($\chi$) will be
proportional to $S^3$,
proportional to b,
inversely proportional to $l^2$,
inversely proportional to $r^2$ (using an equivalent arc for other curves),
proportional to 1/n, if the spring material has been determined (consider every wave as a spring, then spring with n waves is equivalent to n shorter springs connected in series.
Therefore $$1/K=1/K_1+1/K_2+1/K_3+\ldots +1/K_n)$$

II. Selection of Spring Shape
A. Wave Shape: In determining the wave shape of a spring, a matter of main concern is the fabricating method and its fatigue strength. The sinusoidal and exponential reduction curves are superior to others. Research results of large deflection theory indicates that all $n^{th}$-order differentiable curves and combined curves will not cause stress concentrations, thus behave better for shock resistance and fatigue resistance. Other curve shapes can not be used, however, that forementioned curves are better. In cases of large changes of acceleration, the aforementioned curves are greatly preferred.

B. The plate form may be tailored to comply with the stress distribution and adjustment of the spring characteristic, provided the directional vibration requirement has been met.

Referring again to the above equation (1), resonance will take place so long as W($\chi$)=n$\omega_1$ (where n=1, 2, 3 ...k or n=1, $\frac{1}{2}$, $\frac{1}{3}$ ... 1/k) with the operating frequency of power supply being $\omega_1$, it is so called harmonic resonance, which is a non-linear vibtration characteristic.

In application, W($\chi$) is selected as required, then K($\chi$) can be determined based on the inertia mass "m", where K($\chi$) is the general characteristic of the springs required by the system. It is possible to design the spring according to K($\chi$), suppose the characteristic of each spring is R($\chi$), then R($\chi$)=K($\chi$)/n, where "n" is the number of the plate springs.

In a non-linear electromagnetic vibration sieve for example (to be described in detail below), assume that the corrugated plate spring characteristic of a vibrator is $K_A(\chi)$ and the connecting spring characteristic of a sieve is $K_B(\chi)$, its determination is quite simple. $W_A(\chi)$ and $W_B(\chi)$ should be decided first according to the requirements of the sieve. When $W_A(\chi)$ and $W_B(\chi)$ are n times or 1/n times as much as the applied electric frequency (n is an integer) resonance will take place. $K_A(\chi)$ and $K_B(\chi)$ will be determined so long as the mass of electromagnetic vibrator $M_A$ and the mass of sieve $M_B$ are given, and then the characteristic and number of the springs can be designed according to the method described above.

(b) Control and Adjustment of the Stability of Performance Characteristics

Conventional linear electromagnetic vibration devices and vibration machinery are very limited in the region of the stability of performance characteristics under the conditions of fluctuating external loads. Accordingly, complicated electrical control mechanisms are frequently required to improve the stability of performance characteristics. Some existing non-linear type electromagnetic vibration devices, such as rubber spring electromagnetic vibration units and the vibration machinery constructed with it, have been slighty improved in performance stability owing to the feedback of non-linearity characteristic curve, but an electrical control mechanism is still.needed and it is very difficult to control and adjust the self-feedback.

No matter how external loads are fluctuated in the form of mass variation, rigidity variation or damping variation and so on, an electromagnetic vibration device according to the instant invention using non-linear bellows plate-spring groups, by taking such spring group as power source and adding a non-linear type elasticity control element according to the requirements, may utilize the self-feedback of the non-linear type elastic element to control and adjust the performance characteristics in a comparatively large range by selecting and fitting the proper control spring matching the non-linear elasticity curve according to the scope of external load fluctuations. Therefore, the vibration system can maintain a stable state of resonance within the scope of load fluctuation from start to the end. In this manner, the stable performance characteristics can be obtained without adding any electrical control mechanism.

(c) Control and Adjustment of Parallel Connection Combination Push-Pull Resonance of Multi-Sets of Vibration Facility Conventional electromagnetic vibration facilities are usually designed on the basis of a complete series. The types in the series of large electromagnetic vibration facility used as the power source of large vibration machinery are relatively numerous. Accordingly, the large electromagnetic vibration facilities used in large vibration machinery is usually low in efficiency.

Another method of control and adjustment of this invention is illustrated in FIG. 12. In a large vibration machinery having sufficient total rigidity it is possible to use parallel multi-sets of small non-linear type electromagnetic vibration devices. The same power supply can be utilized to realize the parallel connection combination type push-pull resonance of multi-sets of smaller facilities in the same phase. Consequently, small devices can be combined to match large machinery and control and adjustment can be made practical.

Particular Applications

A sieving machine is a kind of general machinery for selecting solid material according to grain grading.

Most conventional sieving machines employ a connecting rod or inertia vibration mechanism constructed with a rotary type motor. The power consumption of such units is high while vibration frequency can not be easily increased. Moreover, it is difficult to control and adjust the stability of vibration of such machines with the change in the mass of body which is being sieved.

Figure 13:
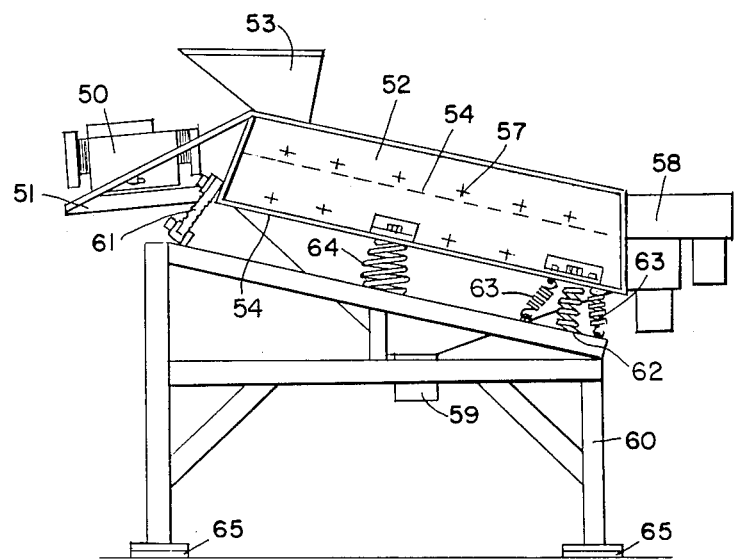
FIG. 13 illustrates a vibrating sieve shaker mechanism according to an embodiment of the instant invention and including a non-linear electromagnetic vibration device.

As shown in FIG. 13, one support type sieving machine with a bi-layer sieving is constructed including a non-linear electromagnetic vibration facility 50 as the power source. The non-linear electromagnetic vibration dynamic head 50 is fixedly connected with a holder 51 to a sieving frame 52. At its front upper part, there is a hopper 53 for feeding material, and in its middle part and at its bottom, is a layer of sieving net 54. At both sides of the nets 54, a tension holder is fixed and the net 54 can be tensioned by a tension device fixed on the sieving frame 52 and tension bolts 57. In the material discharge direction of sieving frame 52 and at the bottom of frame 52, are hoppers 58 and 59 for discharging material are respectively connected and by which the material sieved by using the sieving net with bi-layer and different net can be collected based on coarse, medium and fine grades. The whole sieving frame is placed on the support 60 of sieving machine through three groups of non-linear type control elastic elements installed respectively at its two sides. Non-linear type control elastic elements consist of (a) a combination spring group which is composed of rectangular bellows type plate spring group 61, compressed spiral spring 62 and tension spiral springs 63, and (b) the spiral coil spring 64 or (c) other kinds of proper non-linear type elastic elements. At the bottom of support 60 of sieving machine, a vibration isolator piece 65 is installed.

When exciting vibration current flows in the dynamic head 50 of non-linear electromagnetic vibrator, the electromagnetic vibrator is excited, by which the sieving frame is directly actuated to cause working vibration. The number of bellows type plate spring pieces of the electromagnetic vibrator can be adjusted to cause the machine to reach a resonant state. In reliance on the self feedback characteristics of the non-linear spring group, the resonant state of the sieving machine can be kept stable consistently within the scope of mass variation from no load to full load.

Compared with a connecting rod type vibration sieving machine having a conventional rotary motor and under the conditions of same area and productivity of sieving net, it has been found that the power consumption of this sieving machine can be 5 to 10 times less than that of the latter one.

When concrete surfaces are deposited by layers, the surface of each layer must be roughened after removing an outer surface skin to ensure binding strength between successive layers. It is also often necessary in building maintenance and renewal jobs to roughen a generally planar concrete, asphalt or other similar surface.

Conventional manual roughening is low in efficiency and heavy in labor intensity with a high rate of loss in concrete. A method of roughening by water under high pressure not only employs complicated and costly equipment with high energy consumption but is also subject to rather rigid seasonal restrictions. A method of rughening by sand blasting, besides requiring large energy consumption, also wastes large amounts of sand and requires auxiliary work such as cleaning, material transportation, etc.

Figure 14:
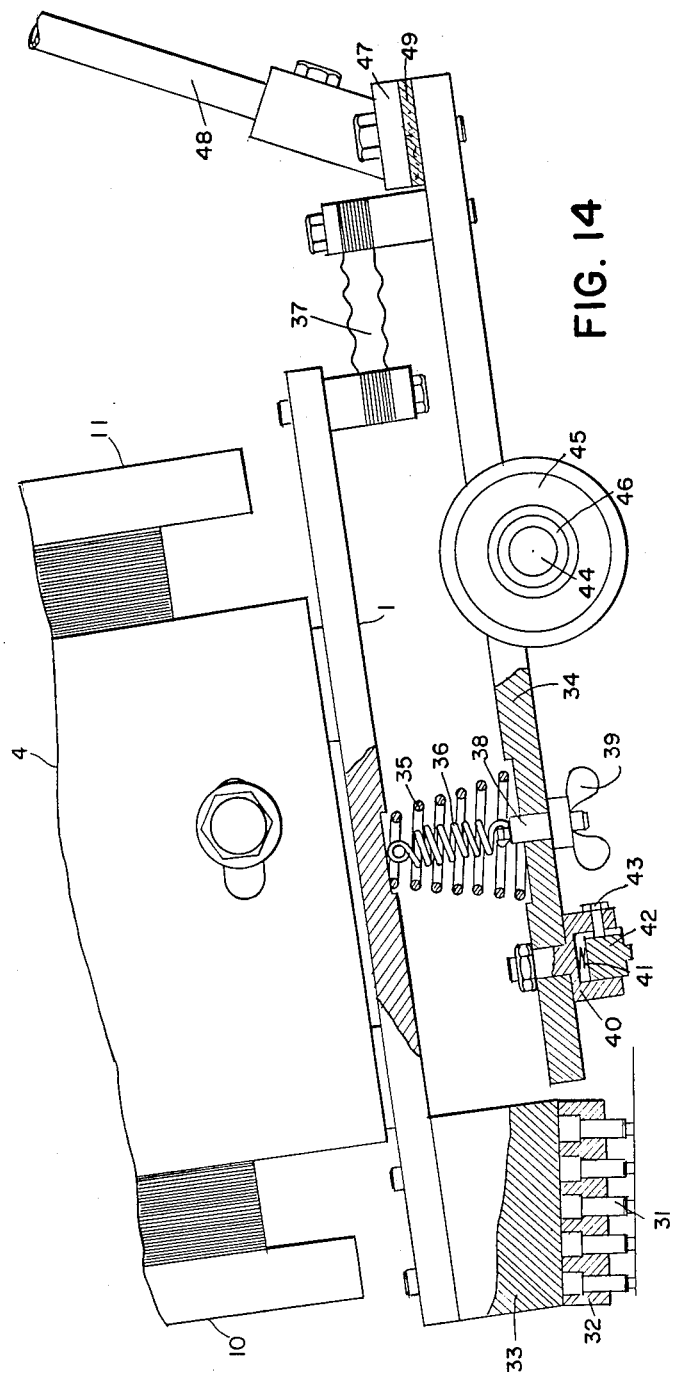
FIG. 14 illustrates a surface roughening mechanism according to an embodiment of the instant invention and including a non-linear electromagnetic vibration device.

As shown in FIG. 14, a concrete chisel roughening machine including a non-linear electromagnetic vibration unit is shown. At the front lower part of the dynamic head base plate of the electromagnetic vibrator is a roughening chisel head. The chisel head includes a plurality of chisel tips 31 arranged on a chisel tip plate 32. Plate 32 is fixedly connected with a base plate 33 of the roughening chisel head and the base plate 1 of the electromagnetic vibrator. The coarse or dense distribution and regular arrangement of chisel tips can be adjusted after disassembling the chisel tip plate 32. The heads of chisel tips 31 are welded with carbide alloy, wear-resistant steel and may be sharpened by multiple wheel grinding. The base plate 1 installed with the dynamic head of the electromagnetic vibrator and the part of the roughening chisel head is connected with a base plate 34 of the carriage by a control spring group which includes three groups of combination springs being composed of sprial coil spring 35 and pull spring 36, and two groups of rectangular bellow type plate spring groups 37. Other kinds of non-linear elastic elements, such as "U" type plate spring etc. can also be used as control spring groups. Pretension adjustment of the combination spring group can be made by bolt 38 and nut 39.

A controller is mounted at a front lower part of the base plate 34 of the carriage for controlling the depth of chiseling and cutting. A spiral coil spring 41 and a control head 42, welded with a carbide alloy tip, is enplaced within a seat 40 connected to the base plate 34. On the control head 42, there is a guide key slot. Along the guide is a limit bolt 43, the control head can move for a certain degree of controlling the chiseling depth, thereby adapting itself to change in a certain working condition. Self-lubricating sleeve 46 is installed between the shaft 44, which is connected on the base plate 34 of carriage, and two wheels 45, thus, making the operation easy and maintenance simplified. At a rear end of the base plate 34 of the carriage, handle seat 47 and handle 48 are installed, and between seat 47 and base plate 34, a shock absorbing seat 49 is installed for damping shock during operation.

The concrete chisel roughening machine, by electromagnetic vibration, is a kind of small scale, flexible and carriage type construction machine tool which can be operated by one man. When exciting vibration current flows in the dynamic head of electromagnetic vibrator, the dynamic head is vibrated, and the vibration can be converted into workpiece chiseling and cutting action by the roughening chisel head. An adjustment of the number of bellow type plate spring pieces of electromagnetic vibrator can cause the machine to reach a resonant state; then, the rougheing operation can start. During operation, the worker should press the chisel head firmly on the ground, walk backwards, slightly moving the operation handle to the left and right, and in the respect of construction technology, preflatten the concrete which is still during the initial solidified period by concrete flat plate vibrator for vibrating the concrete on surface layer as technical preparation, thus, ensuring the removal of an upper layer on the concrete surface with high efficiency. In the case of concrete with different strength owing to different pouring periods, i.e. under the conditions of varying scope of rigidity and damping of external load, corresponding feedback variation in rigidity and damping of whole vibration system can be employed via the non-linear control plate springs having self feedback regulating characteristics. Thus, machine performance can be kept stable.

Figure 15:
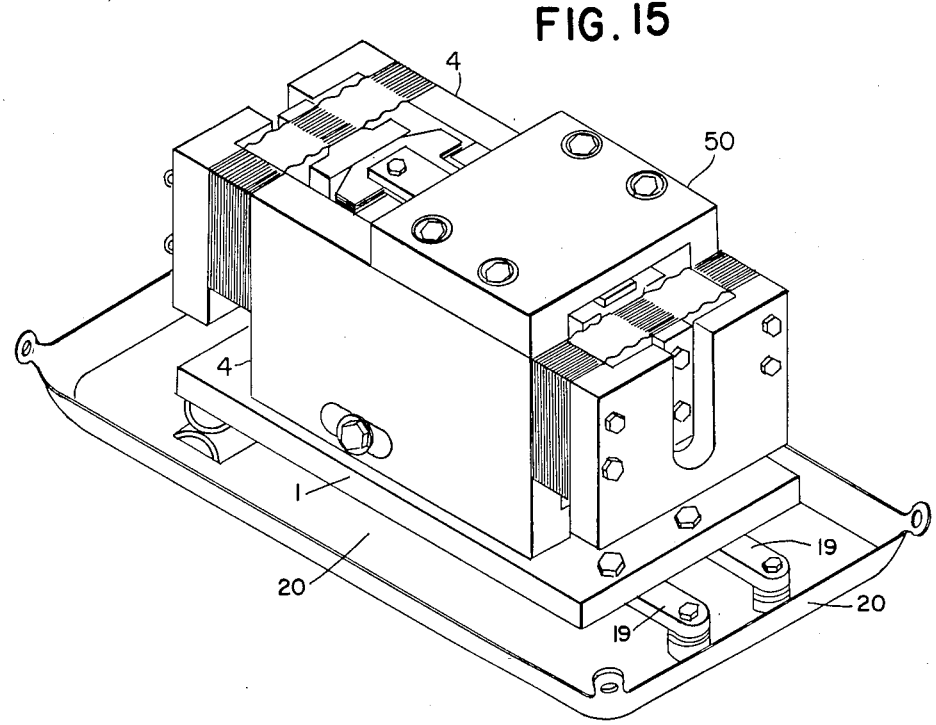
FIG. 15 illustrates a plate shaking, pounding mechanism according to an embodiment of the instant invention and including a non-linear electromagnetic vibration device.

As shown in FIG. 15, a flat plate concrete vibrator including the non-linear electromagnetic vibrator drive is shown. A group of non-linear cantilever type plate springs 19 or other kinds of non-linear elastic elements are installed between the dynamic head of electromagnetic vibrator and a working flat plate 20. In this embodiment the entire dynamic head of electromagnetic vibrator is installed in a cantilever form. Onto the working flat plate 20, one arcuate impact block is welded, the position of which is corresponding to that of another arcuate impact block welded under the base plate 1 of the dynamic head of electromagnetic vibrator. A layer of polyurethane rubber is adhered on the surfaces of the impact blocks so as to reduce the impact noise. The distance between impact blocks can be adjusted by a washer piece for controlling the impact level. A connecting ring is welded at the four corners of working flat plate 20. Then, lifting ropes on the edge may be secured to connector bores on the flat plate 20 can be employed when the concrete flat plate vibrator is used for vibrating a surface of thin concrete.

When exciting vibration current flows in the dynamic head of electromagnetic vibrator, the head is vibrated, and vibrating force, vibrating moment and the impact force produced by the impact blocks are generated on the working base plate 20. The direction of resultant vibration is mainly perpendicular to the base plate 20, and the resultant vibration is transmitted downward, at the same time, there are also horizontal components, thus, making the concrete flat plate vibrator for vibrating the surface of concrete haul easily and more conveniently. Adjustment of the spring piece number of bellows type plate spring of the electromagnetic vibrator can cause the machine to reach the resonant state. When vibration is met with the different concrete (dilute or dense level of different concrete), the rigidity of the external load will be changed. At this time, self feedback adjustment will be made responsive to changing load by the non-linear plate springs, so as to make total rigidity of the system nearly unchange and maintaining the stable vibrating working characteristics.

When the vibration strength produced by this machine is similar to that generated by flat plate vibrator with 1.1 KW inertia type vibration motor, the power consumed is only 0.1–0.2 KW.

Summary Of The Major Advantages

The non-linear elastic component of the vibrator is provided via waveform plate springs fixedly bounded in relation to the electromagnetic core and armature. Smooth non-linear characteristics are generated with enhanced efficiency in many functional respects. The degree of non-linearity may be conveniently selected and altered by design and various combinations of flexible rigidity can be obtained with minimal internal damping and longer fatigue life. The range of self-stability and adjustability, and precision of directional control are greatly expanded. The vibration amplitude can be multiplied by a factor of 2 or 3 and above. Additionally, harmonic resonance frequency multiplication, reduction and conversion can be achieved mechanically and simplistically without requiring a supplemental electronic controlling device.

The invention enables a plurality of vibrators to reach push-pull resonance, resulting in increased efficiency relative to a larger scale single vibrator of equivalent yield. The increased efficiency may be reflected by a reduction in energy consumption approaching 50% and more. With a simple structure, not requiring any auxiliary electronic control mechanism, the instant vibrator has greatly enhanced overall effectiveness, performance efficiency, and range of self-adaptability to varying application environments, as well as a reduced energy consumption requirement from 1 to ten fold less than a corresponding assembly according to the prior art.

With the instant non-linear vibration device, a much greater amplitude and vibration acceleration can be obtained for the same vibration frequency; e.g., for a vibration frequency of 50 Hz, double amplitude of 6 to 7 mm or more is obtainable. Under complicated and randomly varying loads, the vibrator of the instant invention can always maintain a stable resonance state by its self-adapting feedback behavior without any electrical control mechanism. The instant vibrator has a simple structure, produces precise vibrating motion without the use of external guides, or requires no lubrication, generates minimal noise, can be readily sealed, has long service life, and employs a power-head like construction for easy mounting to a base component.

In describing the invention, reference has been made to preferred embodiments. Those skilled in the art, however, and familiar with the disclosure of the subject invention, may recognize additions, deletions, substitutions, modifications, and/or other changes which will fall within the purview of the invention as defined in the claims below.

For instance, an alternative embodiment may employ only one set of sectionalized waveform plate springs, arranged only on one side of the electromagnetic source. Also, plate springs having more than two sections thereon may also be utilized.

What is claimed is:

1. A non-linear electromagnetic vibration device comprising:
   a first vibrating part including,
      a base,
      at least a first end unit connected to said base,
      an armature connected at one end to said end unit, and
      an electromagnetic coil mounted about said armature;
   a second vibrating part including,
      a generally U-shaped electromagnetic core mounted about said armature and said coil, a free end portion of said armature extends into said generally U-shaped electromagnetic core to a posture wherein the free end of the armature is adjacent to but spaced from a base portion of said generally U-shaped electromagnetic core;
   means for operably connecting said first vibrating part to said second vibrating part to permit relative motion between said first vibrating part and said second vibrating part;

said means for operably connecting said first and second vibrating parts including, at least a first generally rectangular, non-linear, bellows plate spring wherein one portion of said spring is rigidly affixed to said first vibrating part and another portion of said spring is rigidly affixed to said second vibrating part; and electrical power means connected to said electromagnetic coil for supplying electrical current pulses to said coil and electromagnetically inducing movement of said armature within said core in opposition to a non-linear restoring spring force of said at least one generally rectangular, non-linear bellows plate spring operably extending between said first vibrating part and said second vibrating part, whereby a resonant, non-linear electromagnetic vibration may be induced between said first vibrating part and said second vibrating part.

2. A non-linear electromagnetic vibration device as defined in claim 1 wherein said at least one generally rectangular, non-linear bellows plate spring comprises:

a sectionalized member having, first and second lateral edge portions and at least one aperture through each edge portion and being operably bolted to said generally U-shaped electromagnetic core;

a central portion having at least one aperture and being operably bolted to said armature, and a plurality of mutually parallel, waveforms in said bellows plate spring between said central portion and said first lateral edge portion and between said central portion and said second lateral edge portion and extending normal to said base, and parallel with said first and second lateral edge portions and said central portion.

3. A non-linear electromagnetic vibration device as defined in claim 2 wherein said at least a first generally rectangular, non-linear, bellows plate spring comprises:

a plurality of generally rectangular, non-linear bellows, plate springs which are stacked together but spaced apart into a mutually parallel array of generally rectangular, non-linear bellows, plate spring sets.

4. A non-linear electromagnetic vibration device as defined in claim 3 wherein:

said bellows plate spring set comprising a non-linear vibrating element is composed of at least two different types of waveform plate springs selected from the group consisting of cross-section curves substantially as shown in FIGS. 9A through 9E.

5. A non-linear electromagnetic vibration device as defined in claim 3 wherein:

each bellows type plate spring piece has a thickness of from 0.3 to 1.5 millimeters.

6. A non-linear electromagnetic vibration device as defined in claim 3 and further comprising:

a plurality of generally rectangular, non-linear bellows, plate spring sets extending between said first vibrating part and said second vibrating part.

7. A non-linear electromagnetic vibration device as defined in claim 6, wherein the number of plate springs in each said generally rectangular, non-linear bellows plate spring sets equals the square of an integral (n) times of a number predeterminably required therein for the vibration device to achieve harmonic resonance.

8. A non-linear electromagnetic vibration device as defined in claim 6, wherein the number of plate springs in each said generally rectangular, non-linear bellows plate spring sets equals the square of an inverse integral (1/n) times of a number predeterminably required therein for the vibration device to achieve harmonic resonance.

9. A non-linear electromagnetic vibration device as defined in claim 1 and further comprising:

an adjustment bolt for selectively varying the space between the free end of said armature and the base portion of said generally U-shaped electromagnetic core having a first portion with threads of one pitch operably engaged with said armature and a second portion with threads of a different pitch operably engaged with said electromagnetic core wherein rotation of said adjustment bolt operably adjusts said armature with respect to said electromagnetic core.

10. A non-linear electromagnetic vibration device as defined in claim 1 wherein:

at least a top edge of said generally rectangular, non-linear, bellows plate spring is linear.

11. A non-linear electromagnetic vibration device as defined in claim 1 wherein:

at least a top edge of said generally rectangular, non-linear, bellows plate spring is concave.

12. A non-linear electromagnetic vibration device as defined in claim 1 wherein:

at least a top edge of said generally rectangular, non-linear, bellows plate spring is convex.

13. A non-linear electromagnetic vibration device as defined in claim 1 wherein:

said armature comprises a generally T-shaped configuration and the length of a leg element of the T-shaped armature is such that the gap between the free end of the leg element of the armature with respect to the base portion of the U-shaped electromagnetic core is equal to a gap that exists between the arm portions of the T-shaped armature and end most leg portions of the U-shaped electromagnetic core.

14. A non-linear electromagnetic vibration device as defined in claim 13 wherein said first vibrating part further includes:

a second end unit connected to said base and extending adjacent to but spaced from the exterior of said electromagnetic core, said second end unit being in alignment with said first end unit; and means for operably connecting said armature of said second end unit.

15. A non-linear electromagnetic vibration device as defined in claim 13 wherein said second vibrating part further includes:

a first side plate connected to a lateral surface of one arm of said generally U-shaped electromagnetic core;

a second side plate connected to the other arm of said generally U-shaped electromagnetic core; and said means for operably connecting said first vibrating part to said second vibrating part comprises, at least one first generally rectangular, non-linear bellows, plate spring having lateral edges rigidly affixed to one of the ends of each of said first and second side plates and a central portion rigidly affixed to said first end unit, and at least one second generally rectangular, non-linear bellows, plate spring having lateral edges rigidly affixed to the other of the ends of each of said first and second side plates and a central portion rigidly affixed to said second end unit.

16. A non-linear electromagnetic vibration device as defined in claim 15 wherein said second vibrating part further comprises:
at least a first mass operably connected between one of the ends of said first and second side plates.

17. A non-linear electromagnetic vibration device as defined in claim 16 and further comprising:
at least a second mass operably connected between the other of the ends of said first and second side plates.

18. A non-linear electromagnetic vibration device as defined in claim 17 and further comprising:
first locking means between said first side plate and said electromagnetic core; and
second locking means between said second side plate and said electromagnetic core, said first and second locking means being operably to release said first and second side plates from said electromagnetic core during periods of adjustment of said adjustment bolt and to unit said members rigidly together following adjustment.

19. A non-linear electromagnetic vibration device as defined in claim 15 wherein said at least one first generally rectangular, non-linear waveform plate spring and said at least one second generally rectangular, non-linear waveform plate spring each comprise:
a plurality of generally rectangular, non-linear bellows plate springs which are stacked together but spaced apart into a mutually parallel array of generally rectangular, non-linear waveform plate spring sets.

20. A non-linear electromagnetic vibration device as defined in claim 19 and further comprising:
means for selectively varying the space between the free end of said armature and the base portion of said generally U-shaped electromagnetic core.

21. A non-linear electromagnetic vibration device as defined in claim 15 wherein:
said first side plate, said armature and corresponding portions of said first and second generally rectangular, non-linear bellows, plate spring forms a first parallelogram configuration and said second side plate, said armature and corresponding portions of said first and second generally rectangular, non-linear bellows plate spring forms a second parallelogram configuration, both of said first and second parallelogram configurations having a common central leg and moving in balanced motion without lateral restraint.

22. A non-linear electromagnetic vibration device as defined in claim 1 wherein:
means for varying the amplitude of vibration of said non-linear electromagnetic vibration device by increasing the voltage of said electrical power means.

23. A non-linear electromagnetic vibration device as defined in claim 1 and further comprising:
another non-linear electromagnetic vibration device as recited in claim 1;
both of said non-linear electromagnetic vibration devices being connected to the same power source and arranged in cooperative push-pull parallel to a member for achieving push-pull resonance vibration of said member.

24. A non-linear electromagnetic vibration device as defined in claim 1 and further comprising:
a sieve frame;
a sieve;
non-linear spring means connected between said sieve and said sieve frame; and
one of said first vibrating part and said second vibrating part being connected to said sieve to vibrate said sieve with a resonate, non-linear electromagnetic vibration.

25. A non-linear electromagnetic vibration device as defined in claim 24 wherein said non-linear spring means connected between said sieve and said sieve frame comprises:
at least one-linear bellows plate spring set.

26. A non-linear electromagnetic vibration device as defined in claim 1 and further comprising:
a carrying base;
a chiseling and cutting head;
non-linear spring means connected between said carrying base and said chiseling and cutting head; and
one of said first vibrating part and said second vibrating part being connected to said chiseling and cutting head to vibrate said chiseling and cutting head with a resonate, non-linear electromagnetic vibration.

27. A non-linear electromagnetic vibration device as defined in claim 26 wherein said non-linear spring means connected between said carrying base and said chiseling and cutting head comprises:
at least one non-linear bellows plate spring set.

28. A non-linear electromagnetic vibration device as defined in claim 1 and further comprising:
a working base plate for vibrating concrete or the like; and non-linear springs operably connecting one of said first vibrating part and said second vibrating part to said working base plate to vibrate said working base plate with a resonate, non-linear electromagnetic vibration.

29. A non-linear electromagnetic vibration device as defined in claim 1 wherein:
the cross-section of said bellows plate spring comprising a non-linear vibrating element corresponds, at least in part to a sine curve.

Figure 9A:
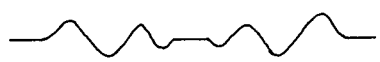

30. A non-linear electromagnetic vibration device as defined in claim 1 wherein:
said bellows plate spring, comprising a non-linear vibrating element, has a cross-section substantially as shown in FIG. 9A.

Figure 9B:

31. A non-linear electromagnetic vibration device as defined in claim 1 wherein:
said bellows plate spring, comprising a non-linear vibrating element, has a cross-section substantially as shown in FIG. 9B.

Figure 9C:
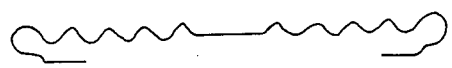

32. A non-linear electromagnetic vibration device as defined in claim 1 wherein:
said bellows plate spring, comprising a non-linear vibrating element, has a cross-section substantially as shown in FIG. 9C.

33. A non-linear electromagnetic vibration device as defined in claim 1 wherein:
said bellows plate spring, comprising a non-linear vibrating element, has a cross-section substantially as shown in FIG. 9D.

34. A non-linear electromagnetic vibration device as defined in claim 1 wherein:

said bellows plate spring, comprising a non-linear vibrating element has a cross-section substantially as shown in FIG. 9E.

35. A non-linear electromagnetic vibration device comprising:
   a first vibrating part including,
      a base,
      at least a first end unit connected to said base,
      an armature connected at one end to said end unit, and
      an electromagnetic coil mounted about said armature;
   a second vibrating part including,
      a base,
      a generally U-shaped electromagnetic core mounted about said armature and said coil and operably connected to said base, a free end portion of said armature extends into said generally U-shaped electromagnetic core to a posture wherein the free end of the armature is adjacent to but spaced from a base portion of said generally U-shaped electromagnetic core;
   means for operably connecting said first vibrating part to said second vibrating part to permit relative motion between said first vibrating part and said second vibrating part;
   said means for operably connecting said first and second vibrating parts including,
      at least a first generally rectangular, non-linear, bellows plate spring wherein a central portion of said spring is provided with an aperture and is rigidly bolted to said first vibrating part and edge portions of said spring are each provided with an aperature and are rigidly bolted to said second vibrating part; and
   electrical power means connected to said electromagnetic coil for supplying electrical current pulses to said coil and electromagnetically inducing movement of said armature within said core in opposition to a non-linear restoring spring force of said at least one generally rectangular, non-linear bellows plate spring operably extending between said first vibrating part and said second vibrating part, whereby a resonate, non-linear electromagnetic vibration may be induced between said first vibrating part and said second vibrating part.

36. A non-linear electromagnetic vibration device as defined in claim 35 wherein said second vibrating part further includes:
   a first side plate connected to said base and to a lateral surface of one arm of said generally U-shaped electromagnetic core;
   a second side plate connected to said base and to the other arm of said generally U-shaped electromagnetic core; and
   said at least a first generally rectangular, non-linear bellows, plate spring has lateral edges rigidly bolted to one of the ends of each of said first and second side plates and a central portion rigidly bolted to said first end unit.

37. A non-linear electromagnetic vibration device as defined in claim 36 wherein:
   said armature comprises a generally T-shaped configuration and the length of a leg element of the T-shaped armature is such that the gap between the free end of the leg element of the armature with respect to the base portion of the U-shaped electromagnetic core is equal to a gap that exists between the arm portions of the T-shaped armature and end most leg portions of the U-shaped electromagnetic core.

38. A non-linear electromagnetic vibration device as defined in claim 37 wherein said first vibrating part further includes:
   a second end unit connected to said base and extending adjacent to but spaced from the exterior of said electromagnetic core said second end unit being in alignment with said first end unit;
   means for operably connecting said armature to said second end unit; and
   at least one second generally retangular, non-linear bellows, plate spring having lateral edges rigidly bolted to the other of the ends of each of said first and second side plates and a central portion rigidly bolted to said second end unit.

39. A non-linear electromagnetic vibration device as defined in claim 38 wherein said at least one first generally rectangular, non-linear waveform plate spring and said at least one second generally rectangular, non-linear waveform plate spring each comprise:
   a plurality of generally rectangular, non-linear bellows plate springs which are stacked together but spaced apart into a mutually parallel array of generally rectangular, non-linear waveform plate spring sets.

40. A non-linear electromagnetic vibration device as defined in claim 39 and further comprising:
   means for selectively varying the space between the free end of said armature and the base portion of said generally U-shaped electromagnetic core.

* * * * *